Figure 1:
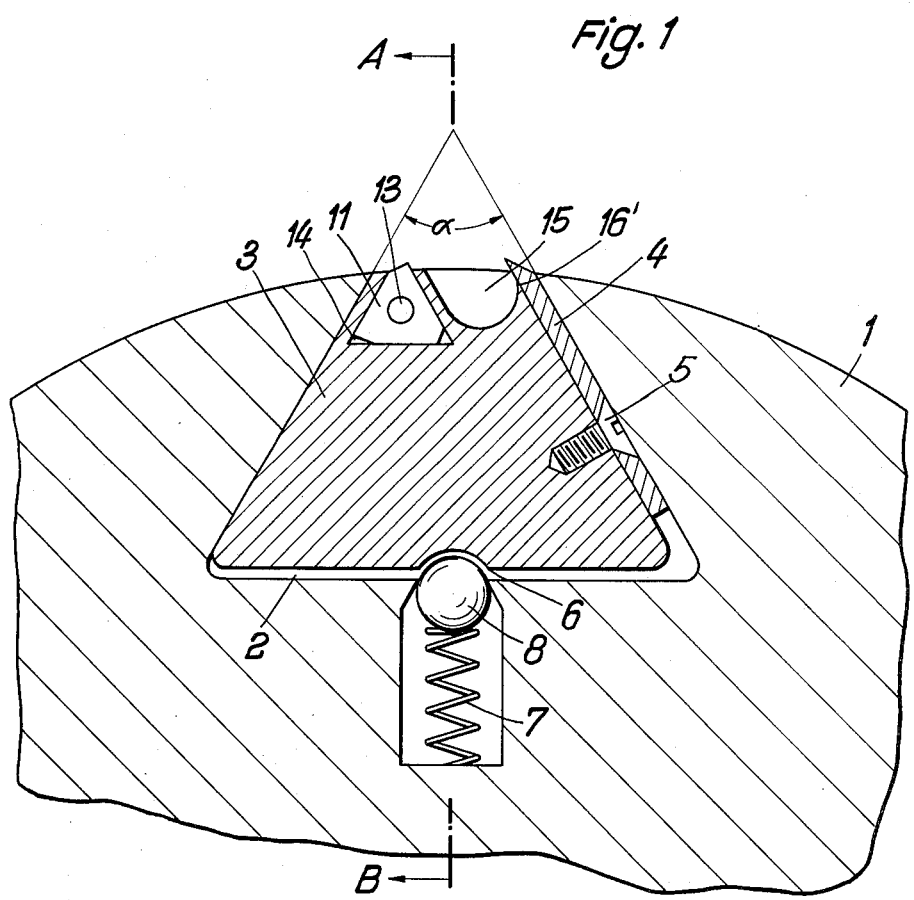

Jan. 23, 1962    G. J. SYBERTZ ET AL    3,017,912
BLADE STRUCTURE AND MOUNTING MEANS FOR A CYLINDER TYPE CUTTER
Filed Sept. 22, 1959    5 Sheets-Sheet 1

Inventors
GUSTAV JOHANNES SYBERTZ
JOHANNES FRANZISKUS SYBERTZ
PETER RUDOLF HEINRICH VOELSKOW
BY Kane and Nydick
ATTORNEYS Jan. 23, 1962   G. J. SYBERTZ ET AL   3,017,912
BLADE STRUCTURE AND MOUNTING MEANS FOR A CYLINDER TYPE CUTTER
Filed Sept. 22, 1959   5 Sheets-Sheet 3

Inventors
GUSTAV JOHANNES SYBERTZ
JOHANNES FRANZISKUS SYBERTZ
PETER RUDOLF HEINRICH VOELSKOW
By
ATTORNEYS

Fig. 4

Inventors
GUSTAV JOHANNES SYBERTZ
JOHANNES FRANCISKUS SYBERTZ
PETER RUDOLF HEINRICH VOELSKOH
By Hane and Nydick
ATTORNEYS Jan. 23, 1962   G. J. SYBERTZ ET AL   3,017,912
BLADE STRUCTURE AND MOUNTING MEANS FOR A CYLINDER TYPE CUTTER
Filed Sept. 22, 1959   5 Sheets-Sheet 5

Inventors
GUSTAV JOHANNES SYBERTZ
JOHANNES FRANCISKUS SYBERTZ
PETER RUDOLF HEINRICH VOELSKOW
By Hane and Nydick
ATTORNEYS United States Patent Office 3,017,912
Patented Jan. 23, 1962

3,017,912
BLADE STRUCTURE AND MOUNTING MEANS FOR A CYLINDER TYPE CUTTER
Gustav Johannes Sybertz and Johannes Franziskus Sybertz, Bad Kreuznach, and Peter Rudolf Heinrich Voelskow, Holle (Hannover), Germany, assignors to Hombak Maschinenfabrik K.G., Bad Kreuznach, Germany
Filed Sept. 22, 1959, Ser. No. 841,517
Claims priority, application Germany Oct. 1, 1958
8 Claims. (Cl. 144—230)

The invention relates to a cylinder type cutter used for producing chips or shavings from wood or similar material, used by fibrous plates and wood cellulose industries. The chips required for the said purposes are to have a predetermined width and length in the direction of the fibers.

In the machines, to which the invention relates, the wood is fed in such a way that the grain of the wood extends parallel to the longitudinal cutting edge of the blades.

As is well known, wood shaving machines of this type are provided with rotating disc-shaped, drum-shaped, cylindrical or cup-shaped shaving tools the blades of which peel the desired width of chips off the wood, etc. The width of chips is mostly adjusted by the amount of protrusion of the blades relative the cutter body and the rate of feed. The length of the chips is predetermined by radially cutting blades, stepped or sawtoothed blades, or serrated blades cutting in a staggered relationship.

Cylinder type cutters are known which are provided with stepped or offset blades of different types to predetermine the length of chips, or else with circular radially cutting blades. These embodiments have in front of the blades chip receiving pockets or grooves, in which the chips may nest after having being cut from the wood. The cylinders carrying the blades in a staggered relationship have the drawback that on the one hand the chip output is very low and on the other hand that the knives themselves are very expensive. As opposed thereto the cylinder type cutters carrying circular cutting blades achieve nearly the double efficiency in cutting-off chips, but the drawback is that the necessary blades cutting in radial planes only cause considerable costs, as they have to be reground and readjusted.

The cylinder type cutters carrying the blades in a staggered relationship are mostly provided with chip pockets, i.e. recesses provided in front of the blades and spaced apart by rather broad sections, so as to first secure an accurate width of the chips and secondly to prevent chips from benig dragged by the blade.

In case a cylinder type cutter provided with a plurality of axially spaced circular blades is used the arrangement of individual pockets in front of the blades separated by the above mentioned sections is not possible, as the pockets would be narrower than the width of the chips and the chips would pack in the pockets. So, in front of such circular blades chip groves have always been provided, causing splinters of wood to be torn off very often and getting into the chip groove.

The attachment or fastening of the blades, stepped blades as well as circular blades, may be improved. It is of prime importance that the changing of the blades require as little time as possible in order to increase the chip output per hour of the machine by decreasing the unproductive time.

In several well known types the cutter head as a whole is interchangeable. The drawback resulting therefrom is obvious and needs not be mentioned in detail.

In other types of cutters the blades have to be reground on the cutter itself.

Likewise it is known to attach the blades to blade mounting means which may be detached after e.g. screws have been unscrewed.

There are also blade mounting means known provided with a plurality of blades, the blades being radially obliquely arranged in praallel spaced relation to each other relative the direction of cutting or peeling.

Among other known types the blade mounting means are positively connected to the cutter by clamping them in wedge-shaped grooves by wedges which are biased by springs. The positive attachment is necessary to prevent radial displacement during operation of the blade mounting means, if they are clamped by the biased wedge as well as by the centrifugal force acting upon it. These wedges mostly have a small wedging angle, i.e. they are selflocking rigidly holding the blade mounting means within the groove. Means are provided to press the biased wedge downwardly for removing the blade mounting means. This type of cutter is operating well but it may be improved and simplified yet, in order to reduce the manufacturing costs.

The main object of the present invention is to provide a cylinder type cutter having a maximum output of chips per hour due to a minimum time required for changing the blade mounting means.

Another object of the invention is to provide blade mounting means provided with a plurality of blades cutting in a radial plane only which forms a unit, readily removable from said blade mounting means, and which is cheap to manufacture.

A further object of the invention is to provide blade mounting means having two or more blades arranged therein extending axially over the entire length of the cutter and having staggered cutting edges, so as to double or otherwise multiply the number of operating blades.

Figure 2:
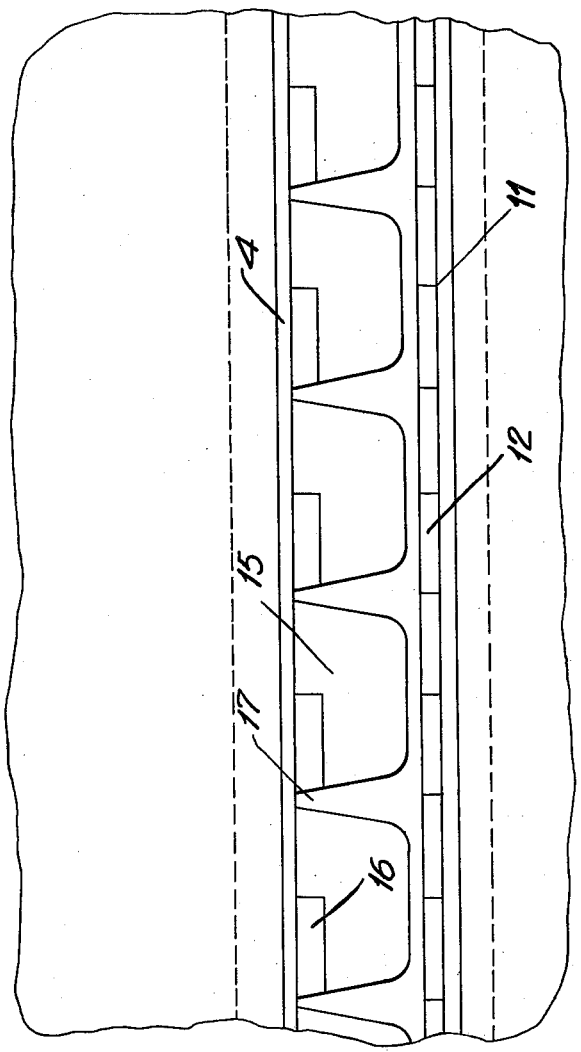
Figure 3:
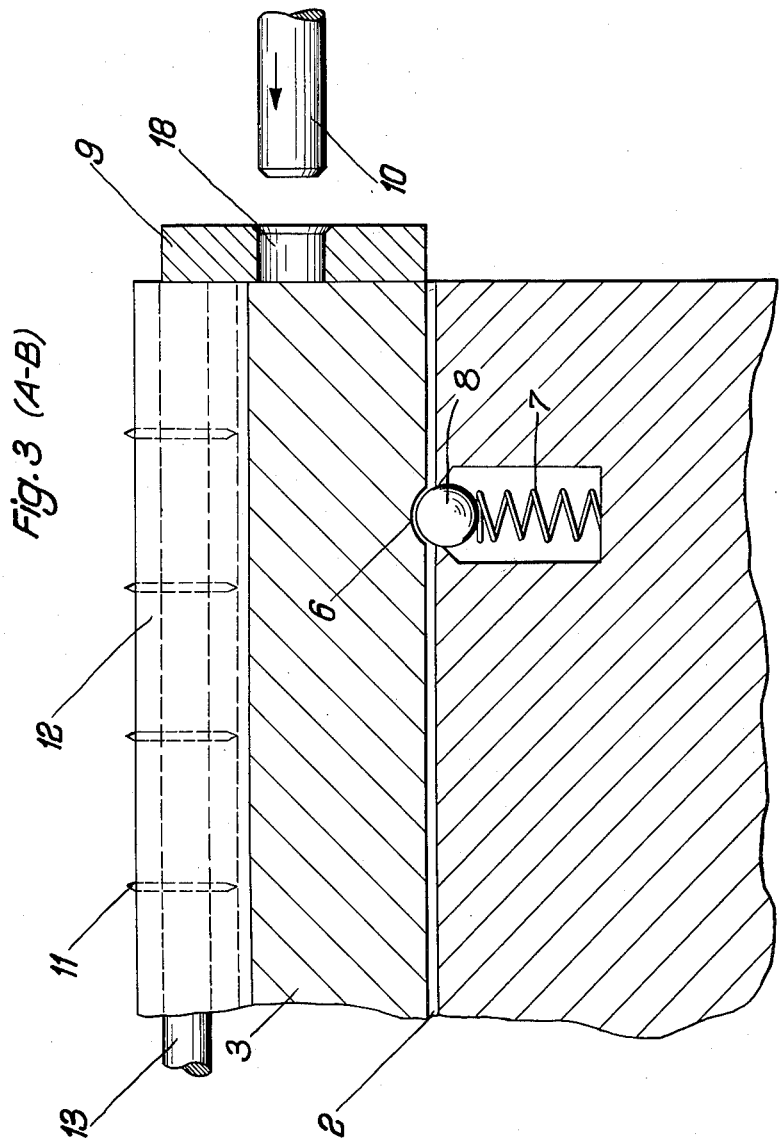
Figure 5:
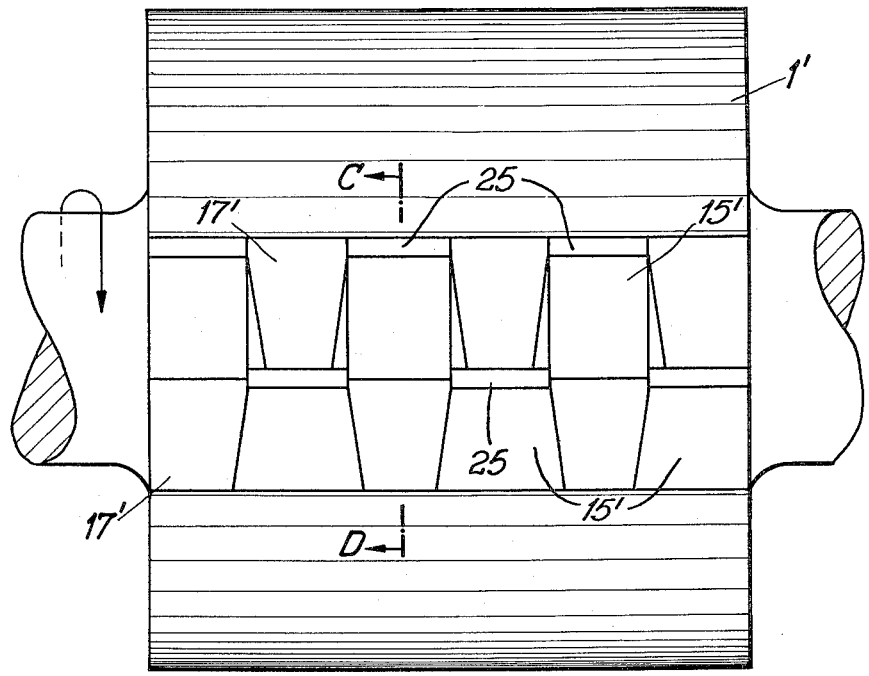
Figure 6:
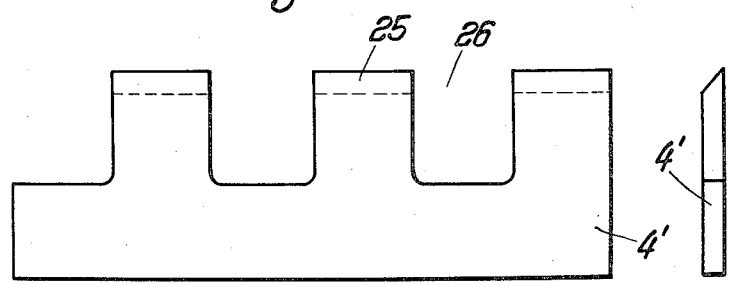

The invention shall now be explained in connection with the accompanying drawings, in which FIG. 1 is a cross section of a portion of a cylinder type cutter, taken along line E—F of FIG. 2, FIG. 2 is a broken plan view thereof, and FIG. 3 is a segmental longitudinal section thereof, taken on the line A—B of FIG. 1, FIG. 4 is a segmental cross section similar to that of FIG. 1 taken along line C—D of FIG. 5 showing two blades arranged in parallel spaced relation extending axially of the cutter, FIG. 5 is a partial plan view of the embodiment shown in FIG. 4, and FIG. 6 is a front elevational of a cutter blade used in the embodiment shown in FIG. 4.

As best shown in FIG. 1 the cylinder type cutter body 1 is provided with axially extending grooves 2 having outwardly converging side walls. The grooves 2 are adapted to accommodate correspondingly shaped blade mounting means 3, which upon rotation of the cutter body 1 will be wedged between the side walls of the groove by the resulting centrifugal force. Blades 4 are mounted on the blade mounting means 3 by screws 5. The angle of the grooves 2 or of the sides of the blade mounting means 3, is made large enough that on the one hand no self-locking action is effected and that on the other hand the blade mounting means 3 with the blades 4 secured thereto will not be forced outwardly to any appreciable amount as a result of the centrifugal force which would be the case, if the angle were very small, possibly self-locking. In this way inaccuracies as to the thickness of chips are avoided. As the blade 4 is secured to the blade mounting means 3 it may be adjusted to an accurate position when being removed out of the blade mounting means 3.

When pushed into the groove 2 the blade mounting means 3 will be engaged by balls 8 urged upwardly by springs 7 into the groove 2 and into recesses 6 provided in the bottom surface of the blade mounting means 3.

In this way the blade mounting means 3 are secured against axial movement and urged into contact with the side walls of the groove 2.

In FIG. 3 this arrangement is also illustrated, and it is shown that the blade mounting means 3 with the ball 8 engaging the recess 6 is also abutting at one end a stop ring 9 defining the axial position of the blade mounting means 3 within the grooves 2 of the cutter. The blade mounting means 3 may easily be pushed out of the groove 2 in an axial direction, when the blades are to be interchanged, by means of a pin 10 entering and extending through an aperture 18 of the stop ring 9 to engage and exert an axially directed force on one end of the blade mounting means 3.

The element, for example spring 7, urging the ball 8 upwardly needs only be strong enough to prevent axial displacement and to ensure radial close fit of the blade mounting means 3 when the cutter comes to a standstill. As soon as the cutter starts rotating the blade mounting means 3 will be arrested by the centrifugal force within the groove.

It has already been mentioned that in order to achieve a maximum output, blades cutting in radial planes only may advantageously be used. These blades do not require chip pockets provided in front of them, and therefore the manufacturing costs may be reduced considerably.

In such an arrangement the blade mounting means 3 may be provided with a plurality of blades 11 cutting in radial planes only. These blades will have to be spaced corresponding to the required length of chips. In accordance with the present invention these blades 11 may consist of flat, polygonally shaped plates having, for example, a triangular shape and being mounted together with spacer elements 12 on a tie rod 13 pushed into the respective groove 14 of the blade mounting means.

In accordance with the invention the corners of the triangularly shaped blades 11 are provided with cutting edges slanting outwardly in the direction of cutting. In case the cutting edges of the corner have become dull, it is merely necessary to remove the blade assembly 11, 12, 13 as a unit out of the groove 14 of the blade mounting means 3, turn it about 120° and replace it again. In this way the blade assembly 11, 12, 13 may be used three times.

When the three cutting edges of said blades 11 have become dull the blades 11 are replaced by new ones, and this will be cheaper than the conventional regrinding.

If a web or rib 17, as shown in FIG. 2, would be provided behind each one of said radially extending blades 11 the chip receiving pockets would become narrower than the width of the chips with the result that the chips would clog the pockets in front of the axially extending blade. In order to avoid this the chip pockets are made twice or nearly twice as wide as the chips so that two chips at a time may enter, in other words, every other rib 17 is omitted.

In order to facilitate the entrance of two chips the chip pockets 15 are provided with two differently inclining surfaces 16 and 16' at the point of entry, so as to cause a superposition of the two chips.

By this arrangement it has become possible to provide in front of the axially extending blade 4 chip pockets 15 which are subdivided by the necessary ribs 17 and yet adapted to accommodate two chips at a time, without any danger of clogging the pockets.

With reference to FIG. 4 two axially extending blades 4' and 4" are provided in parallel spaced relation. The arrangement is similar to that shown in FIG. 1 with the exception that the radially extending blades 11 have been omitted. The cylinder type cutter has also been provided with a wedge-shaped blade mounting body 3' which is provided with a slot 20 disposed angularly relative the diameter of the cutter, and extending over the entire length of the blade mounting body 3' to accommodate a first blade 4'. The width of the blade mounting body 3' is dimensioned in such a way that another slot 21 is formed between the side wall of the blade mounting body 3' and the side wall of the groove 2' to receive the second blade 4". The blades 4' and 4" are provided with registering bores 22, 22' which in turn correspond to the bore 23, and the threaded bore 23' extending from the side wall of the blade mounting body 3' to the middle portion thereof to receive a clamping screw 5' uniting the blades 4' and 4" with the body 3'. As described above chip pockets may be provided in front of the blades to receive the chips.

As shown in FIGS. 5 and 6 the blades 4' and 4" may be provided with recesses 26 thereby forming a plurality of spacedly arranged, axially aligned cutting edges 15 which may be disposed in the blade mounting body 3' in a staggered relationship so that, without using radially extending blades for determining the lengths of chips, the same cutting effect is achieved as with the arrangement shown in FIG. 1.

What is claimed is:

1. A cylinder type cutter serving to cut shavings and chips from wood and similar material, comprising a cylindrical cutter body provided at its peripheral surface with at least one V-shaped groove with outwardly converging side walls extending axially over the entire length of said cutter body; mounting means for cutter blades radially projecting with their cutting edges beyond the peripheral surface of said cutter body and rigidly attached to the mounting means, said mounting means having a cross sectional shape substantially corresponding to that of said groove; and locking means provided at the bottom surface of said groove resiliently biasing said mounting means radially outward in said groove, to releasably engage recesses provided in the bottom surface of said mounting means, said mounting means being wedged between said side walls of said groove by centrifugal force, when said cutter body is rotating.

2. A cylinder type cutter according to claim 1 wherein said mounting means comprises a polygonal block having a first cutting blade secured, relative to the rotating direction, to its trailing side surface and extending over the entire length of said polygonal block; a cutting unit having a plurality of axially spaced second cutting blades having a plurality of cutting edges extending normally to said first cutting blade, said second cutting blades being mounted with spacing elements therebetween on a rod forming a self-contained unit which is slidably received in a groove arranged within said groove from said mounting means adjacent the opposite wall of said first cutting blade and extending axially over the entire length of said cutting means; and a shaving and chip receiving pocket extending axially in front of said first cutting blade the entire length of said groove.

3. A cylinder type cutter according to claim 2, wherein said second cutting blades are shaped substantially triangularly with three short cutting edges being formed at the corners, said groove receiving said second cutting blade unit having a cross sectional shape corresponding to the triangular shape of said second cutting blades.

4. A cylinder type cutter according to claim 2, wherein said chip receiving pocket is subdivided by a plurality of ribs equally spaced in the axial direction, each rib beng aligned wth one of said second cutting blades.

5. A cylinder type cutter according to claim 4, wherein said ribs separate said chip receiving pocket into divisions that are spaced twice the spacing of said second cutting blades, two differently inclinde guide surfaces for said chips being provided within each pocket division, the separating line of said guide surfaces being aligned with the intermediate cutting blade of three adjacent ones of said second cutting blades.

6. A cylinder type cutter according to claim1, wherein plate-like means are arranged at one side of said cutter body provided with apertures aligned with said mounting means, through which apertures a rod may be extended for engaging said mounting means for removing the same out of said groove.

7. A cylinder type cutter according to claim 1, wherein said mounting means comprises a polygonal block, a first cutting blade extending over the entire length of said polygonal block being secured with respect to the rotating direction, to its trailing side surface, said first cutting blade having a plurality of equally spaced notches formed therein along its cutting edge side, the width of said notches being equal to the width of the remaining cutting edges, a second cutting blade extending over the entire length of said polygonal block arranged in spaced, parallel relation to said first cutting blade within a slot formed within said polygonal block, said second cutting blade having likewise a plurality of equally spaced notches formed therein along its cutting edge side, the width of said notches and said cutting edges corresponding to those of said first cutting blade, but being arranged staggeredly relative to each other in such a way that always a cutting edge of one cutting blade registers with a notch of said other cutting blade, said first and said second cutting blades being secured to said polygonal block by common screws.

8. A cylinder type cutter according to claim 7, wherein chip receiving grooves are arranged in front of said first and said second cutting blade, the length of said grooves being substantially equal to that of said cutting edges.

References Cited in the file of this patent
UNITED STATES PATENTS

| | | |
|---|---|---|
| 833,261 | Tardif | Oct. 16, 1906 |
| 1,032,636 | Watkins | July 16, 1912 |
| 1,305,650 | Heggen | June 3, 1919 |
| 2,822,839 | Frodermann | Feb. 11, 1958 |
| 2,825,371 | Forman | Mar. 4, 1958 |

FOREIGN PATENTS

| | | |
|---|---|---|
| 241,723 | Switzerland | Aug. 16, 1946 |
| 610,027 | France | May 29, 1926 |
| 1,046,862 | Germany | Dec. 18, 1958 |